United States Patent [19]

Sluis

[11] Patent Number: 4,658,539

[45] Date of Patent: Apr. 21, 1987

[54] PROCESS FOR BRINGING PREGERMINATED SEED IN A SOWABLE AND FOR SOME TIME STORABLE FORM, AS WELL AS PILLED PREGERMINATED SEEDS

[75] Inventor: Simon J. Sluis, Heiloo, Netherlands

[73] Assignee: Royal Sluis Koninklijke Zaaizaadbedrijven Gebroeders Sluis B.V., Enkhuizen, Netherlands

[21] Appl. No.: 748,746

[22] Filed: Jun. 25, 1985

Related U.S. Application Data

[63] Continuation of Ser. No. 361,891, Mar. 25, 1982.

[30] Foreign Application Priority Data

Mar. 4, 1981 [NL] Netherlands .......................... 8101680

[51] Int. Cl.$^4$ ............................................. A01N 21/02
[52] U.S. Cl. .................. 47/57.6; 47/DIG. 9; 426/419
[58] Field of Search .................... 47/58, 57.6, DIG. 9; 426/419

[56] References Cited

U.S. PATENT DOCUMENTS

| | | | |
|---|---|---|---|
| 3,008,838 | 11/1961 | Brunsing et al. | 426/419 X |
| 3,600,830 | 8/1971 | Hamrin | 47/57.6 |
| 4,116,666 | 9/1978 | Willard | 47/57.6 X |
| 4,272,276 | 6/1981 | Szejtli et al. | 47/57.6 X |
| 4,315,380 | 2/1982 | Davidson | 47/58 |
| 4,344,979 | 8/1982 | Gago et al. | 47/57.6 X |
| 4,562,663 | 1/1986 | Redenbaugh | 47/58 |

*Primary Examiner*—Robert E. Bagwill
*Attorney, Agent, or Firm*—Kane, Dalsimer, Kane, Sullivan and Kurucz

[57] ABSTRACT

The present invention relates to a process for bringing pregerminated seed in a sowable and for some time storable form. The invention further relates to pilled pregerminated seeds.

According to the invention the pregerminated seed is pilled, whereas in the pilling mixture at least one compound which slows down the germinating process is included under formation of a moist pill in which a suitable micro-climate is secured until the time of sowing.

This required micro-climate inside the moist pill is obtained by addition of compounds which have a retarding action to the germinating process, such as compounds having an osmotic effect, e.g. water soluble sugars and their derivatives, salts, or glycols and their polymers; or having a growth retarding action, e.g. absicine acid.

4 Claims, No Drawings

PROCESS FOR BRINGING PREGERMINATED SEED IN A SOWABLE AND FOR SOME TIME STORABLE FORM, AS WELL AS PILLED PREGERMINATED SEEDS

This is a continuation of application Ser. No. 361,891, filed Mar. 25, 1982.

The present invention relates to a process for bringing pregerminated seed in a sowable and for some time storable form. The invention further relates to pilled pregerminated seeds.

Such a process has already from early times been applied in agriculture and horticulture by the farmer who for obtaining a better and quicker germination soaks the seed in advance and admixes the presoaked seed with wet sand in order to be able to divide it better over the land.

Nowadays slowly germinating seed varieties are often pregerminated besides the presoaking, whereby the growing process of the germ root is already started before the seed is sown. Hereby a still quicker emergence of the sowing-seed and together with it a smaller risk of damage by diseases, pests or weather conditions is attained.

Recently in the United Kingdom the so-called "fluid drilling" technique has been developed for sowing such pregerminated seed having a visible germ root of about 2 mm. As described in an article by P.J. Salter in Horticulture Industry. March 1976, page 178–179, this pregerminated seed can readily be handled in water deposits the fragility of the germ root. After addition of a gel forming component the mixture of pregerminated seed and jelly may by means of a specially for this purpose developed machine through trunk-shaped conduits be sown in regular rows in which however the plants emerge at random interdistances. The jelly-like mass of pregerminated seed is however not suitable for application in the existing precision-sowing-machines by which individual seeds are brought in the soil with constant interdistances at the place at which also the later plant is desired. For the seeds which may be used in a precision-sowing-machine should have such a form that they may be put one by one in the soil either mechanically or pneumatically.

Since for many plant varieties, such as for example celery and lettuce, a uniform interdistance is desirable, and the user has anyway already the standard precision-sowing-machine to his disposal for sowing quickly germinating seed varieties, a great need exists in the practice for the possibility of precision sowing pregerminated seed too. Moreover the aforementioned process has also the disadvantage that in a liquid medium the pregerminated seed may only be stored up to 14 days at a temperature of 0°–1° C. and that for that reason in fact the user himself will have to pregerminate the seed shortly before sowing.

The invention aims to provide a process by which the disadvantages mentioned are eliminated in an effective manner.

Therefore the process according to the invention is characterized in that the pregerminated seed is pilled, whereas in the pilling mixture at least one compound which slows down the germinating process is included under formation of a moist pill in which is suitable micro-climate is secured until the time of sowing.

Surprisingly it appeared that the moist pills according to the invention are well sowable with the conventional precision-sowing-machines for dry seed or dry pills, whereas also after longer periods of storage of the moist pills an excellent emergence percentage of the sowing-seed was obtained.

Although the pregerminated seed is only damaged in a slight degree at the application of the coating, it is preferred that the pregerminated seed is pilled before the germ root has broken through the seed-coat, in order to eliminate any chance that the vulnerable germ root can break. Such pregerminated seed in which the germ root is not yet visible, germinates quicker, better and more uniformly than normal, non-pregerminated seed, for instance:

celery: 5–7 days quicker than normal,
leek: 3–5 days quicker than normal,
tomato: 2–3 days quicker than normal.

The speed of germination is dependent of batch and variety, but also of the conditions at which germination takes place. As the conditions are more unfavourable, as when sowing on the outside land, the differences in speed between pregerminated and non-pregerminated seed are larger.

Since the growing process of the new plant has already irreversibly been started in pregerminated seed, the micro-climate to be established inside the formed pill is of vital importance for the surviving chances of the germinating seed and for the emergence percentage upon later sowing. On the one hand the germ may not die off, but on the other the growth must be slowed down to such an extent that the germ root will not burst from the pill already before sowing and be damaged in the precision-sowing-machine.

From the following table representing the percentage of visible germination in a certain time it appears that such a micro-climate is absent in dry pills prepared in a manner usual for non-pregerminated seeds.

TABLE

| | Celery Tall Utah 52–70 R Improved | Leek Kilima |
| --- | --- | --- |
| germinating method: | 20° C., light, filter paper | 15° C., light filter paper |
| non-pregerminated seed: | 91% in 9 days | 95% in 6 days |
| pregerminated seed: | 98% in 3 days | 97% in 4 days |
| pregerminated seed + normally pilled: | 95% in 3 days | 97% in 4 days. |

From this table it appears clearly that the conventional coating has no retarding influence on the germination of the seed which brings the disadvantage that the pilled seeds obtained in this way already sprout and break the pill, before sowing could have taken place.

According to the invention the required micro-climate inside the moist pill is obtained by addition of compounds which have a retarding action to the germinating process, such as compounds having an osmotic and/or growth retarding action. Particularly suitable compounds having an osmotic action are water soluble sugars and their derivatives, salts and glycols and their polymers. Preferably a solution of sodium chloride having a strength of 0.001–1M is used. As compound having growth retarding action for obtaining the desired micro-climate absicine acid is preferred in a concentration of $10^{-6}-10^{-4}$M.

The micro-climate inside the moist pill thus obtained is maintained according to the invention by storing the pills at a temperature of 0°–10° C. and/or under an adapted atmosphere, for example under reduced pressure, until the moment of sowing. In this way the seeds in pilled form are storable for 2-5 weeks, what is long enough to distribute the pills from a central point to the users.

For an optimal sowability according to the invention the moist pills preferably are finished with a smooth mineral compound, preferably with talc.

The pregerminated seed pilled to moist pills according to the invention gives also for slowly germinating seed varieties a quick emergence, a high emergence percentage and a uniform distribution of the emerging vegetation over the land to be cultivated.

The invention is further illustrated by the following non-restrictive examples.

EXAMPLE I

Celery Tall Utah 52-70 R Improved

An amount of 3000 g of pregerminated seed, corresponding with about 1500 g of dry seed, was coated in a conventional pilling kettle (diameter: 1000 mm, rotation speed: 22 rotations per minute) with a coating mixture according to the Netherlands Patent Specification No. 74,911. In order to raise the osmotic value the mixture was sprayed with a 0.2M aqueous solution of sodium chloride during the process. Per 3000 g pregerminated seed 18-43 kg of the coating mixture and about 2.5 l of the salt solution was used for pills of 2-2.5 mm depending of the fineness of the seed.

After the pills had attained the desired size, they were coated with an amount of talc equal to 1.6 times the weight of the pregerminated seed. At the end of the pilling process the pills were sieved on 2-2.5 mm and further stored at 5° C.

Weight of 1000 pills: 11-13 g
Add on weight: 10-18 x
Time of the pilling: 4 h

The pilled pregerminated seed thus obtained was sown by means of a precision-sowing-machine on press pots in the green house at 18° C. and after 10 days an emergence percentage of 97% was observed. When the pilled pregerminated seed had been stored before sowing during 20 days at 5° C. under vacuum, the emergence percentage was 96% 9 days after sowing.

EXAMPLE II

Leek Alaska

An amount of 5000 g of pregerminated seed, corresponding to about 3000 g of dry seed, was coated in a conventional pilling kettle (diameter: 1000 mm, rotation speed: 22 rotations per minute) with a coating mixture according to the Netherlands Patent Specification No. 72,576.

In order to increase the osmotic value a 0.3M aqueous solution of sodium chloride was sprayed. Per 5000 g pregerminated seed 32-38 kg of the coating mixture and 1-1.5 l of salt solution was used for pills of 3-3.5 mm depending of the fineness of the seed.

For finishing the pills 5000 g of mineral compound was used. At the end of the pilling process the pills were sieved on 3-3.5 mm, directly transferred to a sealed tin under reduced pressure and stored at 5° C.

Weight of 1000 pills: 40-45 g
Add on weight: 8.5-10 x
Time of the pilling: 2.5-3 h
Emergence percentage at sowing in the green house on press pots: 98% after 7 days
Emergence percentage at sowing after intermediate storage during 17 days at 5° C.: 96% after 7 days

EXAMPLE III

The Examples I and II were repeated applying the coating mixture according to the Netherlands Patent Specification No. 139,091.

Instead of the salt solution 0.5-1M solutions of sugar or 1-20% by weight solutions of glycol were used for increasing the osmotic value. The pills obtained showed properties comparable with those of the preceding examples.

EXAMPLE IV

The Examples I and II were repeated applying the coating material according to the Netherlands Patent Specification No. 139,091. Instead of the salt solution for increasing the osmotic value in this case $10^{-5}$M absicine acid was used as compound having growth retarding action. The pills obtained showed properties comparable with those of the preceding examples.

I claim:

1. A process for providing pregerminated seed in a sowable and storage form, which comprises; pilling the pregerminated seed with a pilling mixture containing at least one compound which slows down the seed germinating process under conditions whereby formation of a moist pill occurs; and maintaining the pills moist at a temperature of 0°-10° C. and/or under reduced atmospheric pressure.

2. Process according to claim 1, characterized in that the moist pill is coated with a smooth mineral compound.

3. Process according to claim 2, characterized in that talc is used as the mineral compound.

4. Pilled pregerminated seed, obtained by the process of claim 1.

* * * * *